US006959562B2

(12) United States Patent
Navedo et al.

(10) Patent No.: US 6,959,562 B2
(45) Date of Patent: Nov. 1, 2005

(54) PORTABLE FROZEN DRINK MACHINE

(75) Inventors: Jose Enrique Navedo, Wichita, KS (US); James Michael Boenig, Seguin, TX (US)

(73) Assignee: The Coleman Company, Inc., Wichita, KS (US)

(*) Notice: Subject to any disclaimer, the term of this patent is extended or adjusted under 35 U.S.C. 154(b) by 0 days.

(21) Appl. No.: 10/737,592

(22) Filed: Dec. 15, 2003

(65) Prior Publication Data

US 2005/0126201 A1 Jun. 16, 2005

(51) Int. Cl.[7] .................................................. F25C 5/02

(52) U.S. Cl. .......................................... 62/320; 366/251

(58) Field of Search ............................ 62/320; 366/242, 366/244, 247, 249, 251

(56) References Cited

U.S. PATENT DOCUMENTS 3,791,597 A 2/1974 Walter et al.
3,837,587 A 9/1974 Walter et al.
4,681,030 A 7/1987 Herbert
4,745,773 A 5/1988 Ando
5,072,590 A * 12/1991 Burrows ..................... 62/3.64
5,242,125 A 9/1993 Rupp
5,619,901 A * 4/1997 Reese et al. .................. 99/275
5,772,075 A 6/1998 Ash, Jr. et al.
5,897,064 A 4/1999 Rupp
6,082,589 A 7/2000 Ash et al.
6,095,677 A 8/2000 Karkos, Jr. et al.
6,194,013 B1 2/2001 Kolar et al.
6,210,033 B1 4/2001 Karkos, Jr. et al.
6,336,603 B1 1/2002 Karkos, Jr. et al.
6,342,260 B2 1/2002 Kolar et al.
6,378,740 B1 4/2002 Martin
6,390,665 B1 5/2002 Silveria
6,431,744 B1 8/2002 Ash et al.
6,438,987 B1 8/2002 Pahl
6,527,212 B2 3/2003 Rupp
6,527,433 B2 3/2003 Daniels, Jr.
6,772,675 B2 * 8/2004 Ervin .......................... 99/275
2002/0053616 A1 5/2002 Rupp
2002/0089894 A1 7/2002 Parlor, Sr.
2003/0000240 A1 1/2003 Pahl
2003/0099154 A1 5/2003 Daniels, Jr.

FOREIGN PATENT DOCUMENTS

EP 0 290 696 A2 11/1988
EP 0 710 446 A1 5/1996
JP 60-145052 A 7/1985
WO WO 02/066148 A1 8/2002
WO WO 03/022067 A1 3/2003
WO WO 03/056985 A2 7/2003

* cited by examiner

*Primary Examiner*—William E. Tapolcai
(74) *Attorney, Agent, or Firm*—Leydig, Voit & Mayer Ltd.

(57) ABSTRACT

A portable frozen drink machine that utilizes ice shaving technology for producing ice particles for a frozen drink. An ice hopper utilizing the ice shaving technology is connected by a common shaft to a mixer. The mixer is positioned below the ice hopper and extends into a beverage container. Ingredients for the frozen drink are put in the beverage container, and the ice particles fall downward from the ice hopper into the beverage container. The mixer stirs the ingredients, forming a well-mixed frozen drink.

18 Claims, 2 Drawing Sheets

PORTABLE FROZEN DRINK MACHINE

TECHNICAL FIELD OF THE INVENTION

The present invention is directed to small appliances, and more particularly to portable small appliances.

BACKGROUND OF THE INVENTION

Tailgating and camping are two recreational activities enjoyed by many people. For tailgating, people often sit around cars or at picnic tables, usually prior to sporting events and enjoy food and beverages. When camping, people enjoy sitting around the fire, and may also enjoy beverages.

The beverages that are consumed while tailgating or camping are typically drinks that can be kept on ice. These beverages are usually stored in a cooler until consumed.

One type of beverage that typically is not enjoyed while tailgating or camping is a frozen beverage, or frozen drink. A frozen beverage is a drink having a liquid mixed with small ice particles. The drink may or may not include alcohol. Examples of drinks that are typically served as a frozen beverage are margaritas, piña coladas, and daiquiris. Typically, the ice particles in a frozen drink are small enough so that a consumer of such a beverage can comfortably swallow the ice particles. The ice particles melt as they enter the person's body, and thus the drink provides a welcome chill on a hot day.

While many people enjoy frozen beverages, the machines and devices for making such beverages are typically not available without an AC power source. Thus, campers and tailgaters have typically been limited to chilled drinks and drinks with ice cubes in them, and have not been able to enjoy frozen drinks.

Recently, at least one company has started manufacturing and selling portable blenders. The portable blenders operate on batteries or a rechargeable battery pack. Although portable blenders work well for their intended purpose, such blenders utilize a lot of power, and a set of batteries or a recharger typically can produce only about one to two gallons of chopped ice. Thus, the use of such blenders is limited, unless a tailgater or camper has a large supply of batteries.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A portable frozen drink machine is provided. In accordance with an embodiment of the invention, the portable frozen drink machine utilizes ice shaving technology for producing ice particles for a frozen drink.

In accordance with an embodiment of the invention, an ice hopper utilizing the ice shaving technology is connected by a common shaft to a mixer. The mixer is positioned below the ice hopper and extends into a beverage container. Ingredients for the frozen drink are put in the beverage container, and the ice particles fall downward from the ice hopper into the beverage container.

In accordance with an embodiment of the invention, a spout may be provided for dispensing frozen beverages from the beverage container. In addition, if desired, legs may be provided on the bottom of the portable frozen drink machine so that the spout is positioned above a tabletop or other surface on which the portable frozen drink machine is resting.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
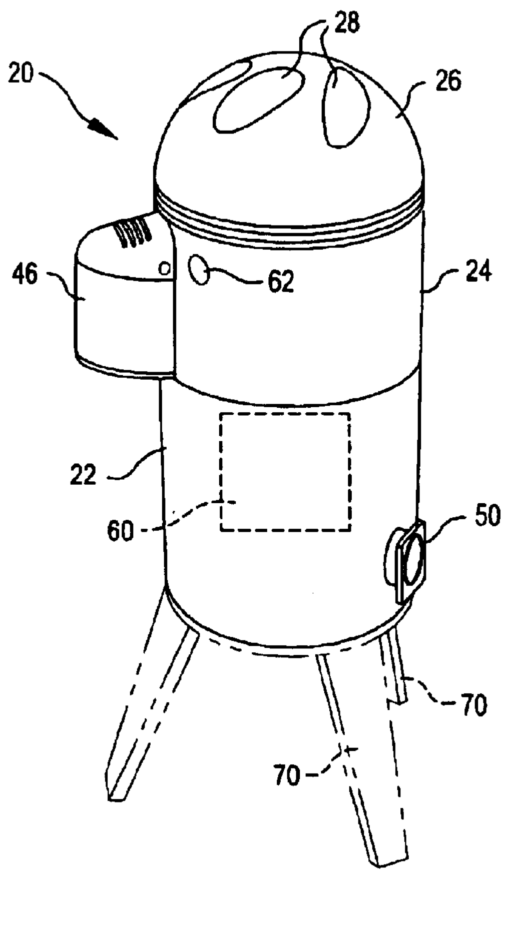
FIG. 1 is a side perspective view of a frozen drink machine in accordance with an embodiment of the invention.
Figure 3:
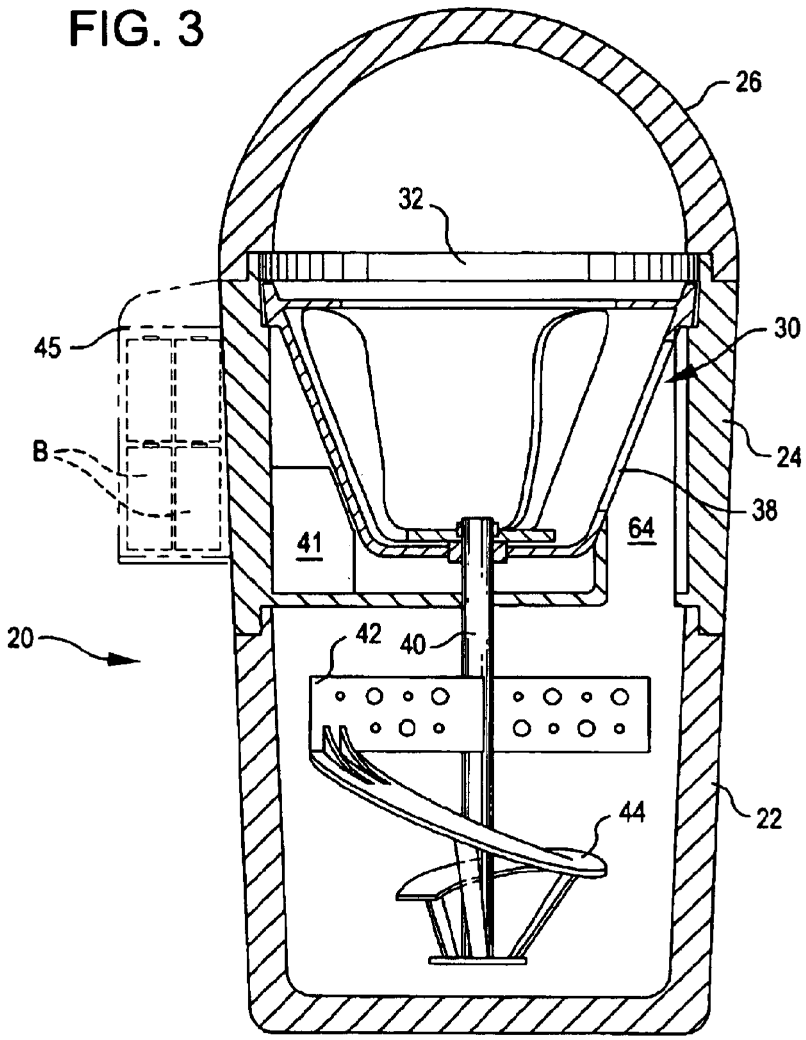
FIG. 3 is a sectional view of the frozen drink machine of FIG. 1.

Referring now to the drawings, in which like reference numerals represent like parts throughout the several views, FIG. 1 shows a frozen drink machine 20 in accordance with an embodiment of the invention. The frozen drink machine 20 includes an insulated beverage container 22 at a bottom portion thereof. A motor housing 24 is mounted above the insulated beverage container 22. A lid 26 fits over the top of the motor housing 24.

Briefly described, as further described below, the frozen drink machine 20 is arranged and configured so that a user may remove the lid 26, for example using finger grips 28, and may pour or place ice cubes in an ice hopper 30 that is mounted in the top of the motor housing 24. Ice in the ice hopper 30 is then shaved, and falls down into the insulated beverage container 22. The particles of shaved ice are mixed with beverage and drink ingredients in the insulated beverage container 22, creating a frozen beverage.

When the frozen drink machine 20 is assembled, the lid 26 rests on top of the motor housing 24. If desired, the lid 26 may lock into position, for example by rotating the lid relative to the motor housing 24.

The motor housing 24, on the other hand, rests on the outer rim of the insulated beverage container 22. Again, if desired, the motor housing 24 may be configured so that it can lock onto the top of the insulated beverage container 22.

Although shown as having a lid 26, the frozen drink machine 20 may alternatively include other structures at its top. For example, a pitcher or other similarly shaped structure for holding additional ice may be utilized. The pitcher or other structure may be configured so that ice contained therein is directed into the ice hopper 30. Thus, a user would not be required to continually add ice to the ice hopper 30. Instead, the ice would automatically feed into the ice hopper 30 until the ice in pitcher or other structure is emptied.

Figure 2:
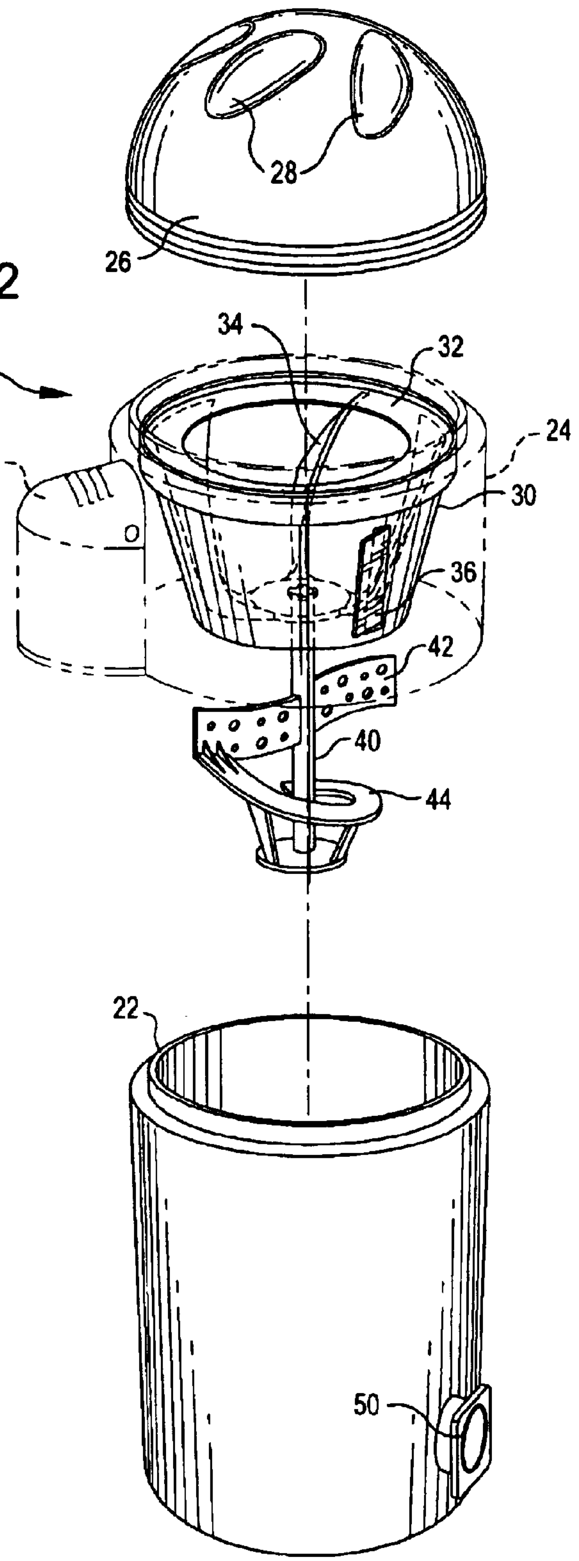
FIG. 2 is an exploded perspective view of the frozen drink machine of FIG. 1.
Figure 4:
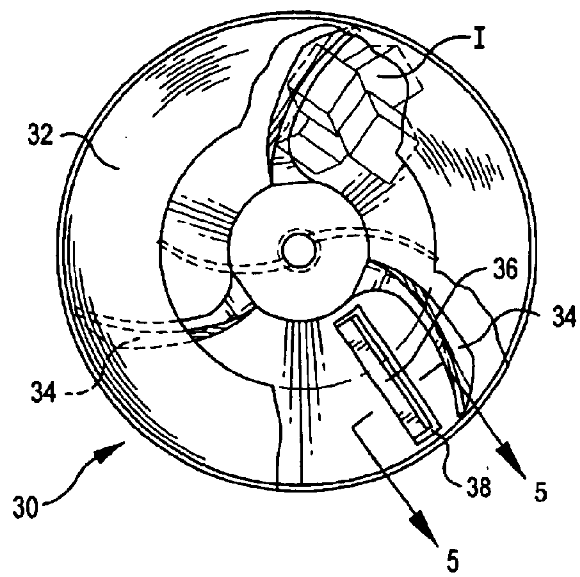
FIG. 4 is a top, partial cut-away view of an ice hopper for the frozen drink machine of FIG. 1.

Details of the ice hopper 30 are shown in FIGS. 2 and 4. The ice hopper 30 is generally bowl-shaped, being upwardly concave in configuration. A lip 32 extends around an upper perimeter of the ice hopper 30 and prevents ice within the ice hopper 30 from popping out of the hopper. Impellers 34 are positioned inside the ice hopper 30. The impellers 34 are mounted for rotation within the ice hopper 30. A blade 36 is positioned in one side of the ice hopper 30 and extends through a slot 38 in the ice hopper 30, at an angle to the face of the interior of the ice hopper 30, as can best be seen in FIG. 5.

The impellers 34 are mounted for rotation with a shaft 40. The shaft 40 is turned by an electric motor 41 that may be, for example, mounted within the motor housing 24. The motor 41 may directly drive the shaft 40 or may be positioned so that it drives the shaft 40 with a gear structure, such as a worm gear. Electric motors, gear drives, and their use are known, and details are not given here.

As shown in the drawings, specifically referring to FIG. 4, the impellers 34 are positioned so that they rotate in a clockwise fashion. The impellers 34 include a sloped surface, with an outer edge of the surface being positioned ahead of a rear surface of each impeller 34 so that the impellers 34 drive ice I into contact with the face of the ice hopper 30 as the impellers 34 are rotated. In this manner, as the impellers 34 rotate past the blade 36, the ice I engages the blade 36 and particles of the ice I are chopped off of the ice I. This type of cutting of the ice is called "shaving," and is often used to create "shaved ice," a popular drink, usually put in a cup, that includes very smooth, fine ice onto which syrup is poured. Throughout the United States, shaved ice is often sold as "Hawaiian Shaved Ice," the most popular name used. In New Orleans, a cup of shaved ice is called a "snoball," sometimes spelled "snowball." In eastern North Carolina, some people call a cup of shaved ice, a shaver.

Ice shaving is not the operation used by a blender. A blender utilizes blades that rotate at high speeds at the bottom of a container. Ice is chopped by the blades, not shaved. The inventors have found the shaving process utilized by the present invention to be a far more efficient process of generating ice particles, because ice shaving requires less energy input than the chopping operation performed by a blender.

Figure 5:
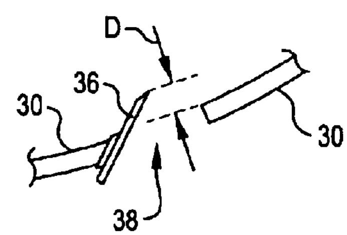
FIG. 5 is a sectional view taken along the section lines 5—5 of the ice hopper of FIG. 4.

In any event, in accordance with an embodiment of the invention, the ice hopper 30 is altered with respect to typical shaved ice machines in that it is configured to make smaller particles of ice. To this end, the spacing of the outer edge of the blade 36 from the inner surface of the ice hopper 30, designated by the dimension "D" in FIG. 5, is less than in a typical shaved ice machine, which is usually about one quarter inch, or 6.25 millimeters. This dimension is less because the present inventors have found that the ice particles for a frozen drink are preferably smaller than ice particles for a shaved ice beverage because smaller particles require less energy to produce and mix better than the larger particles. To this end, the inventors have found that properly altering a typical shaved ice hopper can result in the proper sized ice particles. Specifically, the inventors have spaced the outer edge of the blade 36 from the inner surface of the ice hopper 30 so that the distance D is less than 6 millimeters, preferably 1 to 4 millimeters, and more preferably 2 to 2.5 millimeters. This dimension D may be varied so as to provide a desired ice particle size. However, the particular spacing set forth above for the dimension D has worked particularly well in that it provides ice particles that are not so small that they melt when entering the beverage mix in the insulated beverage container 22 and do not take too long to produce, and are not so large as to require a large amount of power for rotation of the shaft 40, do not mix well, and/or that would be uncomfortable to swallow.

A mixer blade 42 is mounted on the bottom of the shaft 40. A helical blade 44 is attached to an outer, bottom edge of the mixer blade 42 and extends downward into the bottom of the insulated beverage container 22.

In accordance with an embodiment of the invention, the frozen drink machine 20 is configured to be used as a portable device, and includes a cordless, self-contained power source. For example, batteries B may be used for powering the motor 41. As an alternative, rechargeable batteries or a rechargeable battery pack may be used in place of the batteries B. In addition, if desired, an AC power adaptor or a car lighter adapter may be used to power the frozen drink machine 20. Solar panels may also be used. In addition, if desired, the frozen drink machine 20 may be configured to be used with an AC power supply, although such a power source would not be self-contained.

In the embodiment shown, the batteries B are mounted in a battery housing 46 on the side of the motor housing 24. However, if desired, the batteries B may be mounted inside the motor housing 24, or may be provided on a pack or other structure that is mounted separate from the frozen drink machine 20. In the embodiment shown, four D-cell batteries B are utilized, but a different size or number of batteries can be used in accordance with alternate embodiments.

In accordance with an embodiment of the invention, a spout 50 is provided on the bottom portion of the insulated beverage container 22. The spout 50 may be one of many different configurations, but in general is configured to open and close a valve at the bottom of the insulated beverage container 22 to allow fluid to flow out of the insulated beverage container 22. To prevent clogging of the spout, an opening for the spout is preferably ½ inch or larger, more preferably ¾ inch or larger.

In accordance with an embodiment of the invention, as generally indicated by the dotted lines 60 in FIG. 1, a door or panel may be provided on the insulated beverage container 22 or, alternatively, at the bottom of the motor housing 24, for permitting a user to pour mixer ingredients or to add other ingredients to a beverage being made in the insulated beverage container 22. The panel or door 60 may hinge outward, or may be removable, in different embodiments.

In operation, a user removes the lid 26, and pours or otherwise places ice in the ice hopper 30. The lid 26 is then replaced onto the motor housing 22, and is locked in place, if relevant. If desired, a safety switch (not shown) may be provided to prevent operation of the ice hopper 30 without placement of the lid 26.

The user also places mixer ingredients into the insulated beverage container 22. These ingredients may be poured in by removing the motor housing 24 from the top of the insulated beverage container 22, or may be added through the panel or door 60 on the side of the insulated beverage container 22. If, for example, the user is making a margarita, then the margarita ingredients and alcohol (if desired) are placed into the insulated beverage container 22. The user then turns on the frozen drink machine 20, for example by engaging a switch 62 (FIG. 1). Alternatively, the frozen drink machine 20 may be configured so that it automatically turns on when the lid 26 is put into place or is locked into place, or may be turned on in another manner.

When the frozen drink machine 20 is turned on, the shaft 40 begins to rotate, causing the impellers 34 to drive ice I into contact with the blade 36. Ice shaved by the blade 36 falls through a channel 64 located within the motor housing 24. The channel 64 opens directly into the insulated beverage container 22, permitting the ice particles to fall into the bottom of the insulated beverage container 22, or at least into or onto the beverage ingredients and/or ice particles already in the insulated beverage container. In accordance with an embodiment of the invention, the remainder of the bottom of the motor housing 24, other than the channel 64, is sealed so as to protect the motor 41 and other drive elements for the shaft 40 from fluids contained within the insulated beverage container 22.

In accordance with an embodiment of the invention, the helical blade 44 is preferably configured so that, as the impellers 34 are driving the ice into the blade 36, the helical blade 44 is pushing ingredients within the insulated beverage container 22 from a top of the insulated beverage container 22 downward from the mixer blade 42. The mixer blade 42, on the other hand, continues to mix the ingredients within the insulated beverage container 22. The combined helical blade 44 and the mixer blade 42 work well to thoroughly mix the ingredients within the insulated beverage container 22, and assure that the ice does not just all flow to the top. The helical blade 44 may alternatively be arranged to direct ice particles and drink ingredients upward.

The inventors have found that rotating the shaft 40 at approximately 150 revolutions per minute results in thorough mixing of the ingredients within the insulated beverage container 22 and also a relatively quick production of ice particles from the ice hopper 30.

After the insulated beverage container 22 has been filled with ice particles and the mixer ingredients, a user may operate the spout 50 to have the contents pour into a glass or other suitable container. The insulation on the insulated beverage container 22 prevents the mixed drink from melting.

If desired, retractable, removable, or permanent legs 70 (FIG. 1) may be provided for spacing the frozen drink machine 20 from a tabletop or other surface on which the frozen drink machine 20 is resting. In this manner, a user may place a glass or other container underneath the spout 50 without having to move the frozen drink machine 20 to the edge of the table.

The shaving process provided by the ice hopper 30 of the frozen drink machine 20 provides an efficient means of generating ice particles for a frozen drink. The inventors have found that four D cell batteries may be used to generate up to approximately ten gallons or more of ice particles that may be used for the making of frozen beverages. Moreover, the frozen drink machine 20 is an all-in-one, compact unit that produces ice particles, blends a drink with the ice particles, keeps the drink cold, and dispenses the mixed drink.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A frozen drink machine, comprising:

an ice shaver connected to a shaft, the rotation of which operates the ice shaver, the ice shaver being mounted to a housing;

a motor for rotating the shaft;

a beverage container positioned below the ice shaver to receive ice particles made by the ice shaver, the beverage container supporting the housing; and a mixer, driven by the motor and positioned for mixing drink ingredients and the ice particles in the beverage container.

2. The frozen drink machine of claim 1, further comprising a portable, self contained, cordless power source for supplying power to the motor.

3. The frozen drink machine of claim 2, wherein the power source is one or more batteries.

4. The frozen drink machine of claim 1, further comprising a spout on the beverage container.

5. The frozen drink machine of claim 1, further comprising a door or panel on the beverage container for adding drink ingredients to the beverage container.

6. The frozen drink machine of claim 1, wherein the beverage container is insulated.

7. The frozen drink machine of claim 1, wherein the mixer is configured to rotate with the shaft.

8. The frozen drink machine of claim 7, wherein the mixer comprises a mixing blade.

9. The frozen drink machine of claim 8, wherein the mixer comprises a helical blade.

10. The frozen drink machine of claim 7, wherein the mixer comprises a helical blade.

11. The frozen drink machine of claim 1, wherein the mixer comprises a mixing blade.

12. The frozen drink machine of claim 11, wherein the mixer comprises a helical blade.

13. The frozen drink machine of claim 1, wherein the mixer comprises a helical blade.

14. The frozen drink machine of claim 1, wherein the ice shaver comprises an ice hopper, the ice hopper comprising:

an impeller for rotating ice around the ice hopper along a path; and a blade in the path for shaving the ice as the ice passes the blade.

15. The frozen drink machine of claim 14, wherein the blade is spaced so as to shave ice a thickness of ice less than approximately 6 millimeters.

16. The frozen drink machine of claim 15, wherein the blade is spaced so as to shave ice a thickness of ice in the range of approximately 1 to 4 millimeters.

17. The frozen drink machine of claim 16, wherein the blade is spaced so as to shave ice a thickness of ice in the range of approximately 2 to 2.5 millimeters.

18. The frozen drink machine of claim 1, wherein the motor is mounted within or on the housing.

* * * * *